(12) United States Patent
Woeste et al.

(10) Patent No.: US 11,276,971 B2
(45) Date of Patent: Mar. 15, 2022

(54) HERMAPHRODITIC CABLE CONNECTORS FOR AUTONOMOUS VEHICLES

(71) Applicant: APTIV TECHNOLOGIES LIMITED, St. Michael (BB)

(72) Inventors: Guido Woeste, Schwelm (DE);
Christian Schäfer, Bochum (DE);
Ulrich Rudack, Witten (DE)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 0 days.

(21) Appl. No.: 16/885,658

(22) Filed: May 28, 2020

(65) Prior Publication Data

US 2020/0381880 A1  Dec. 3, 2020

Related U.S. Application Data

(60) Provisional application No. 62/855,883, filed on May 31, 2019.

(51) Int. Cl.
*H01R 24/84* (2011.01)
*H01R 13/115* (2006.01)
(Continued)

(52) U.S. Cl.
CPC ......... *H01R 24/84* (2013.01); *B60R 16/0231* (2013.01); *H01R 13/115* (2013.01); *G05D 1/0088* (2013.01)

(58) Field of Classification Search
CPC ........................................ H01R 24/84–13/115
See application file for complete search history.

(56) References Cited

U.S. PATENT DOCUMENTS

| 4,138,184 A | 2/1979 | Knopp |
| 4,963,102 A * | 10/1990 | Gettig .................... H01R 13/28 439/291 |

(Continued)

FOREIGN PATENT DOCUMENTS

| CN | 1113045 A | 12/1995 |
| CN | 101854003 A | 10/2010 |

(Continued)

OTHER PUBLICATIONS

Chinese Office Action for Chinese Patent Application No. 202010484953.5 dated Jun. 23, 2021.

(Continued)

*Primary Examiner* — Vanessa Girardi
(74) *Attorney, Agent, or Firm* — Carlson, Gaskey & Olds, P.C.

(57) ABSTRACT

A cable connector includes a first portion, a second portion, a first electrical prong, and a second electrical prong. The first portion defines a cavity. The second portion is adjacent to the first portion. The second portion includes a mounting structure defining a first cross-sectional void region within the cable connector and a second-cross-sectional void region within the cable connector opposite the first cross-sectional void region. The first electrical prong is disposed, in part, in the first cross-sectional void region and extends from the second portion. The second electrical prong is disposed, in part, in the second cross-sectional void region and extends from the second portion.

14 Claims, 13 Drawing Sheets

(51) Int. Cl.
    *B60R 16/023*     (2006.01)
    *G05D 1/00*     (2006.01)

(56) References Cited

U.S. PATENT DOCUMENTS

| | | | | |
|---|---|---|---|---|
| 5,035,639 | A * | 7/1991 | Kilpatrick | H01R 13/28 439/290 |
| 5,322,460 | A * | 6/1994 | Hass | H01R 13/115 439/849 |
| 10,598,880 | B2 * | 3/2020 | Mullaney | G02B 6/383 |
| 2002/0189106 | A1 | 12/2002 | Henningsen | |
| 2004/0038591 | A1 | 2/2004 | Clement et al. | |
| 2008/0128151 | A1 | 6/2008 | Debladis et al. | |
| 2013/0196555 | A1 | 8/2013 | Scherer et al. | |

FOREIGN PATENT DOCUMENTS

| | | |
|---|---|---|
| CN | 202259707 U | 5/2012 |
| CN | 102723135 A | 10/2012 |
| DE | 4025380 C1 | 10/1991 |
| EP | 3367514 A1 | 8/2018 |
| JP | 2015144083 A | 8/2015 |
| WO | 2015017501 A1 | 2/2015 |

OTHER PUBLICATIONS

European Search Report for European Application No. 20177217.5 dated Jul. 31, 2020.
Chinese Office Action for Chinese Patent Application No. 202010485815.9 dated Sep. 1, 2021.

* cited by examiner

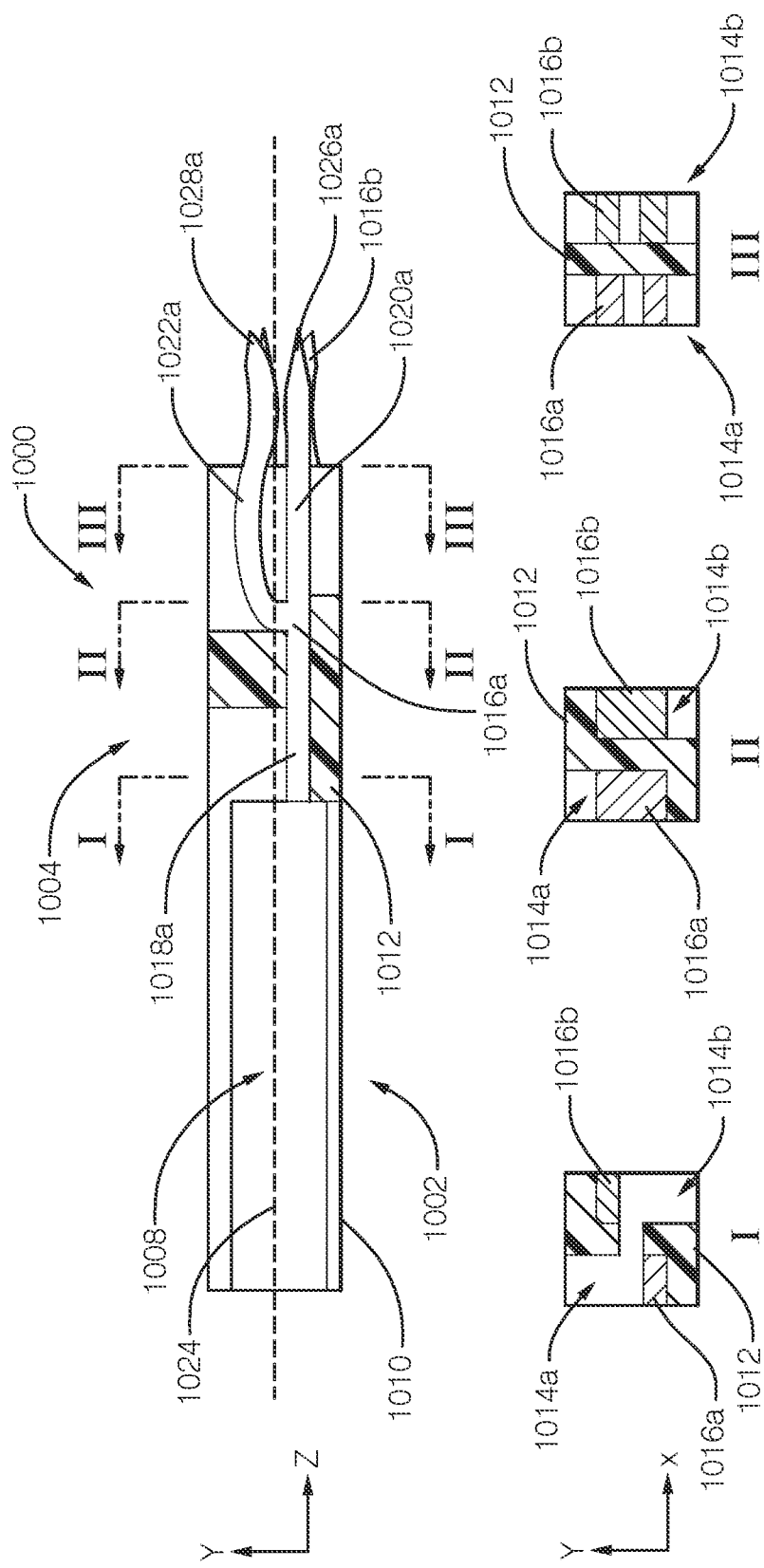
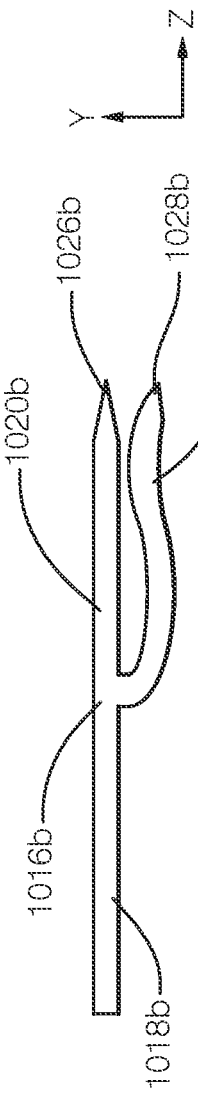
FIG. 10A
FIG. 10B

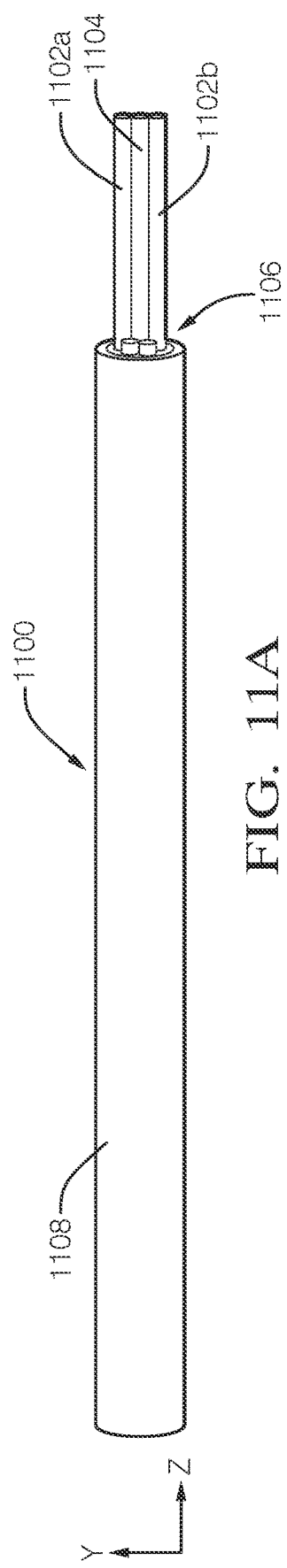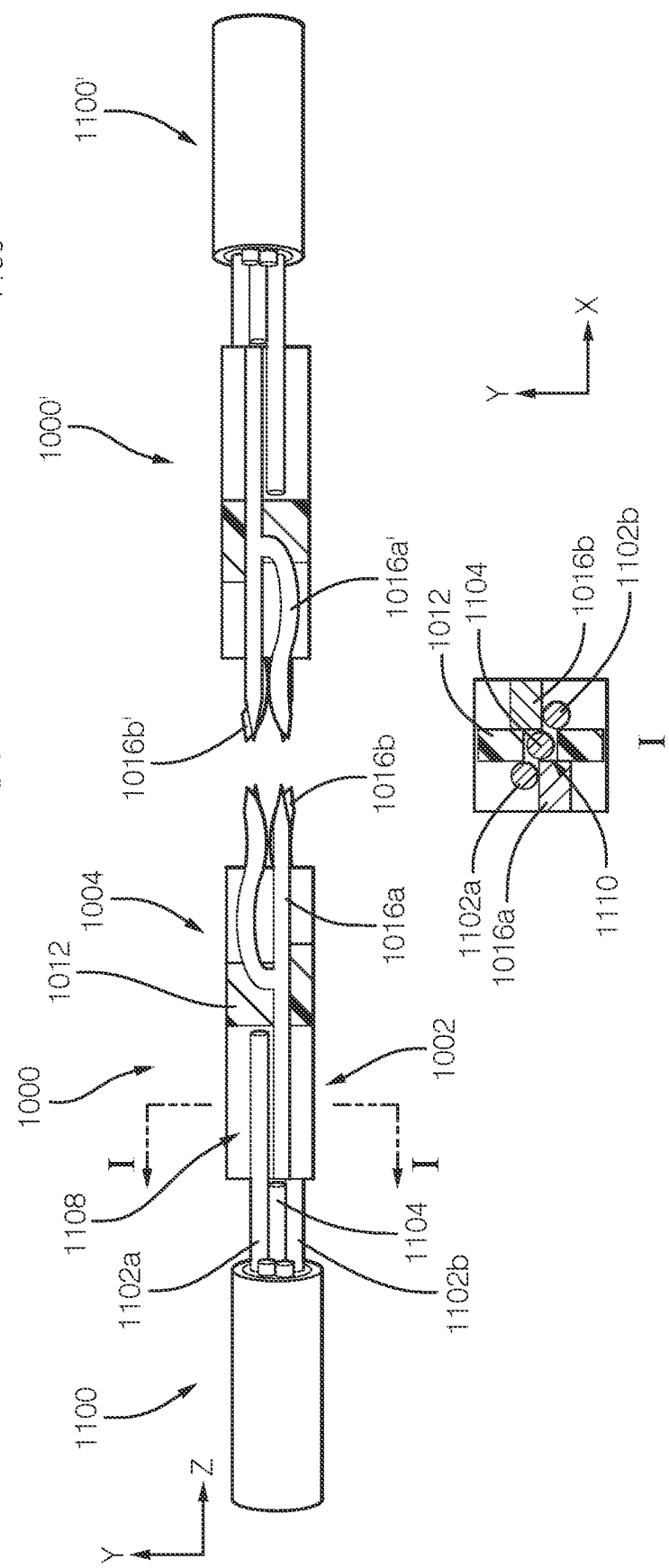
FIG. 11A
FIG. 11B

HERMAPHRODITIC CABLE CONNECTORS FOR AUTONOMOUS VEHICLES

CROSS-REFERENCE TO RELATED APPLICATION

This application claims priority to U.S. Provisional Application No. 62/855,883, filed on May 31, 2019.

FIELD OF THE INVENTION

This description relates to cable connectors for facilitating physical and electrical interconnections between electronic components in autonomous vehicles.

BACKGROUND

Autonomous vehicles can be used to transport people and/or cargo (e.g., packages, objects, or other items) from one location to another. As an example, an autonomous vehicle can navigate to the location of a person, wait for the person to board the autonomous vehicle, and traverse to a specified destination (e.g., a location selected by the person). As another example, an autonomous vehicle can navigate to the location of cargo, wait for the cargo to be loaded into the autonomous vehicle, and navigate to a specified destination (e.g., a delivery location for the cargo).

Autonomous vehicles can include one or more electronic components. Electrical signals can be transmitted to and/or from electronic components using electrically conductive cables or wires.

SUMMARY

In an aspect, a cable connector includes a first portion, a second portion, a first electrical prong, and a second electrical prong. The first portion defines a cavity. The second portion is adjacent to the first portion. The second portion includes a mounting structure defining a first cross-sectional void region within the cable connector and a second-cross-sectional void region within the cable connector opposite the first cross-sectional void region. The first electrical prong is disposed, in part, in the first cross-sectional void region and extends from the second portion. The second electrical prong is disposed, in part, in the second cross-sectional void region and extends from the second portion.

Implementations of this aspect can include one or more of the following features.

In an embodiment, the first electrical prong and the second electrical prong each include a respective base portion, a respective first prong portion projecting from the base portion, and a respective second prong portion projecting from the base portion.

In an embodiment, the base portion is secured to the mounting structure.

In an embodiment, each base portion is configured to electrically couple to a respective conductor of a communications cable.

In an embodiment, the first prong portion is substantially straight.

In an embodiment, the second prong portion defines a curved path.

In an embodiment, the second prong portion includes a concave segment.

In an embodiment, the second prong portion includes a convex segment adjacent to the concave segment.

In an embodiment, the first prong and the second prong are each configured to accept between them a corresponding prong of a second cable connector substantially similar to the cable connector.

In an embodiment, the corresponding prong of the second cable connector is substantially similar to the first prong.

In an embodiment, the second prong is configured to bend upon an insertion of the corresponding prong of the second connector between the first prong and the second prong.

In an embodiment, the mounting structure defines a recess between the first cross-sectional void region and the second cross-sectional void region.

In an embodiment, the recess is configured to receive an insulative strand of a communications cable.

In an embodiment, a cross-sectional periphery of the connector defines a square.

In an embodiment, a length of the square is 2.54 mm or less, and a height of the square is 2.54 mm or less.

In an embodiment, a length of the square is approximately 2.54 mm, and a height of the square is approximately 2.54 mm.

In another aspect, a system includes a plurality of cable connectors sections. Each cable connector section includes a respective first portion, a respective second portion, a respective first electrical prong, and a respective second electrical prong. The first portion defines a cavity. The second portion is adjacent to the first portion. The second portion includes a mounting structure defining a first cross-sectional void region within the cable connector section and a second-cross-sectional void region within the cable connector section opposite the first cross-sectional void region. The first electrical prong is disposed, in part, in the first cross-sectional void region and extending from the second portion. The second electrical prong is disposed, in part, in the second cross-sectional void region and extending from the second portion.

Implementations of this aspect can include one or more of the following features.

In an embodiment, the plurality of cable connector sections includes a first cable connector section and a second cable connector section. The first cable connector section is disposed adjacent the second cable connector section.

In an embodiment, at least a portion of the first cable connector section is integrally formed with at least a portion of the second cable connector section.

In an embodiment, a distance between a central axis of the first cable connector section and a central axis of the second cable connector section is approximately equal.

In an embodiment, the distance is approximately 2.54 mm.

In an embodiment, a distance between a central axis of any cable connector section of the plurality of cable connector sections and a central axis of another cable connector section of the plurality of cable connector sections adjacent that cable connector section is approximately equal.

In an embodiment, the distance is approximately 2.54 mm.

In an embodiment, a periphery of the plurality of cable connector sections defines a substantially rectangular cross-section.

In an embodiment, each first electrical prong and each second electrical prong includes a respective base portion, a respective first prong portion projecting from the base portion, and a respective second prong portion projecting from the base portion.

In an embodiment, each base portion is secured to a respective mounting structure.

In an embodiment, each base portion is configured to electrically couple to a respective conductor of a communications cable.

In an embodiment, each first prong portion is substantially straight.

In an embodiment, each second prong portion defines a respective curved path.

In an embodiment, each mounting structure defines a respective recess between the first cross-sectional void region and the second cross-sectional void region.

In an embodiment, each recess is configured to receive a respective insulative strand of a communications cable.

One of more of the embodiments described herein can provide a variety of technical benefits. In an embodiment, a single cable connector facilitates multiple physical and electrical interconnections concurrently. As an example, a single cable connector facilitates multiple interconnections between multiple discrete conductors of a cable and multiple corresponding conductors of another component. This can be beneficial, for instance, in simplifying the process of assembling and/or maintaining an electrical system.

In an embodiment, a physical environment is designed to accommodate a particular number of interconnections within a particular physical space. One or more of the cable connectors described herein facilitate a greater number of interconnections within the same physical space. As an example, a particular standardized design convention for automotive electrical systems specifies that cable connectors include one or more physical cells, each having particular physical dimensions, and each accommodating a single respective interconnection. One or more of the cable connectors described herein are used to provide multiple interconnections within each cell (e.g., two, three, or more).

These and other aspects, features, and implementations can be expressed as methods, apparatus, systems, components, and in other ways.

These and other aspects, features, and implementations will become apparent from the following descriptions, including the claims.

BRIEF DESCRIPTION OF THE DRAWINGS

FIG. 10A shows an example cable connector.

FIG. 10B shows an example electrical prong.

FIG. 11A shows an example cable.

FIG. 11B shows two example cables and two example cable connectors.

DETAILED DESCRIPTION

Figure 1:
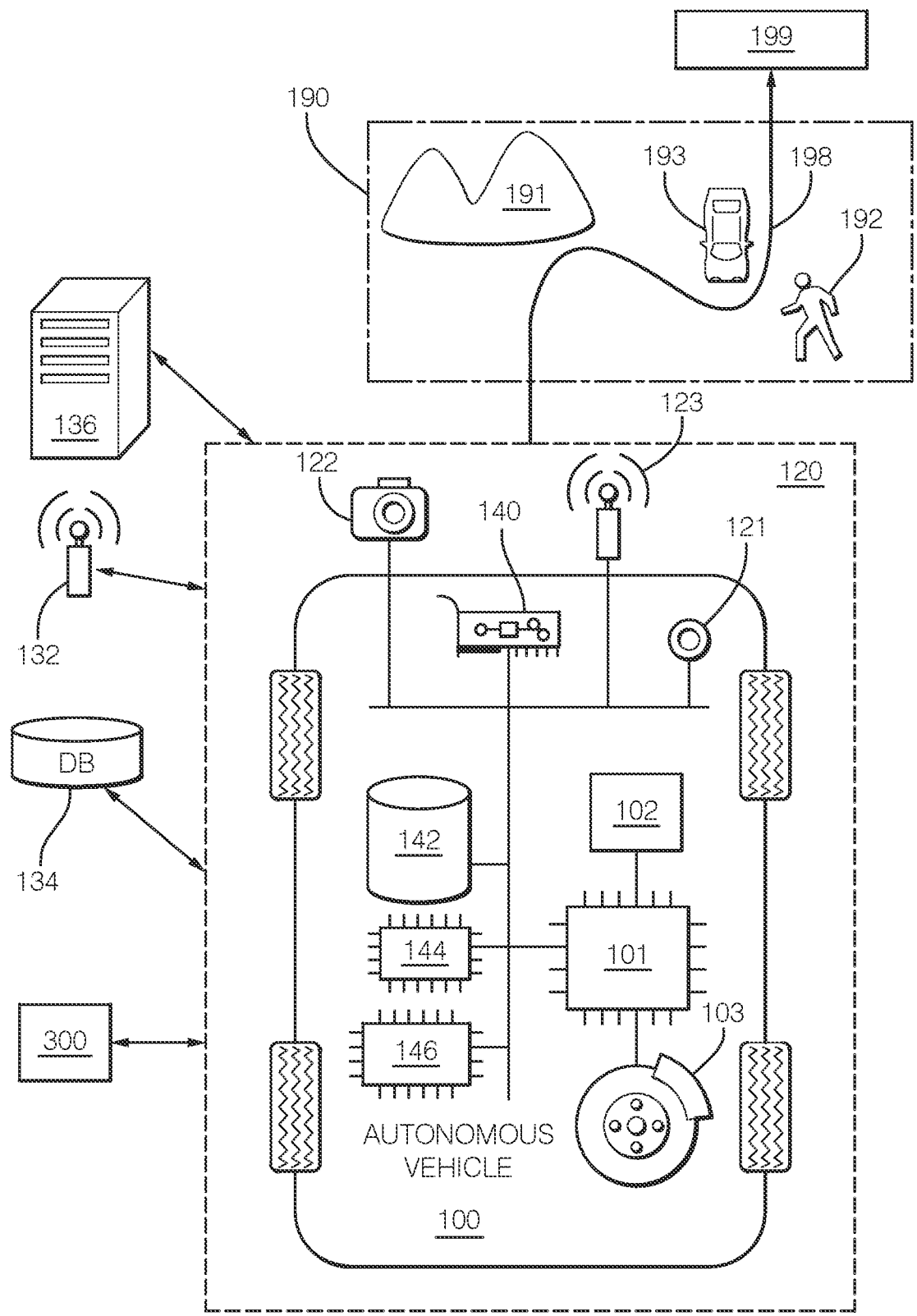
FIG. 1 shows an example of an autonomous vehicle having autonomous capability.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. Hardware Overview
3. Autonomous Vehicle Architecture

4. Autonomous Vehicle Inputs
5. Autonomous Vehicle Planning
6. Autonomous Vehicle Control
7. Remotely Monitoring and Controlling the Operation of Autonomous Vehicles
8. Example Processes for Monitoring and Controlling the Operation of a Fleet of Autonomous Vehicles General Overview Cable connectors provide a physical and electrical interface between a cable and another component. As an example, a cable connector includes a first portion that physically couples with one or more conductors of a cable, and a second portion that physically couples with one or more conductors of another component (e.g., another cable or electronic component). Electrical signals from the cable are transmitted to the other component via the cable connector.

In an embodiment, a cable connector includes one or more physical features that facilitate physical and electrical interconnection between the cable and the other component. As an example, a cable connector is attached on one end to a cable, and includes on the other end a plug configured to insert into a corresponding receptacle of a component, such that the cable is securely attached to the component. As another example, a cable connector is attached on one end to a cable, and includes on the other end a receptacle configured to receive a corresponding plug of a component, such that the cable is securely attached to the component.

In an embodiment, a single cable connector facilitates multiple interconnections concurrently. For example, a single cable connector facilitates multiple interconnections between multiple discrete conductors of a cable and multiple corresponding conductors of another component. This can be beneficial, for instance, in simplifying the process of assembling and/or maintaining an electrical system.

In an embodiment, a physical environment is designed to accommodate a particular number of interconnections within a particular physical space. One or more of the cable connectors described herein can facilitate a greater number of interconnections within the same physical space. As an example, a particular standardized design convention for automotive electrical systems specifies that cable connectors include one or more physical cells, each having particular physical dimensions (e.g., each cell being approximately 2.54 mm×2.54 mm in cross-section, such as 2.54 mm±10%× 2.54 mm±10%), and each accommodating a single respective electrical interconnection (e.g., an interconnection between a single conductor with another single conductor). One or more of the cable connectors described herein can be used to provide multiple interconnections within each cell (e.g., two, three, or more). This can be beneficial, for instance, as it enables a greater number of interconnections to be made within a particular physical space and/or using few physical materials. Accordingly, an electrical system can be implemented in a more space-efficient and/or weight-efficient manner. Further, this enables electrical systems to be implemented using pre-existing physical environments and/or design conventions (e.g., having standardized physical dimensions and/or components), thereby reducing the cost and time associated with designing and implementing the overall system.

Hardware Overview

FIG. 1 shows an example of an autonomous vehicle 100 having autonomous capability.

As used herein, the term "autonomous capability" refers to a function, feature, or facility that enables a vehicle to be operated without real-time human intervention unless specifically requested by the vehicle.

As used herein, an autonomous vehicle (AV) is a vehicle that possesses autonomous capability.

As used herein, "vehicle" includes means of transposition of goods or people. For example, cars, buses, trains, airplanes, drones, trucks, boats, ships, submersibles, dirigibles, etc. A driverless car is an example of an AV.

As used herein, "trajectory" refers to a path or route generated by an AV to navigate from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor" includes one or more physical components that detect information about the environment surrounding the physical components. Some of the physical components can include electronic components such as analog-to-digital converters, a buffer (such as a RAM and/or a nonvolatile storage) as well as data processing components such as an ASIC (application-specific integrated circuit), a microprocessor and/or a microcontroller.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment (e.g., a system providing on-demand network access to a shared pool of configurable computing resources, such as networks, network bandwidth, servers, processing, memory, storage, applications, virtual machines, and services). In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies descried in this document also are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 autonomously or semi-autonomously along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 204 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, radar, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 208 or storage device 210 described below in relation to FIG. 2. In an embodiment, memory 144 is similar to the main memory 206 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 212, input device 214, and cursor controller 216 discussed below in reference to FIG. 2. The coupling is wireless or wired. Any two or more of the interface devices may be integrated into a single device.

Figure 2:
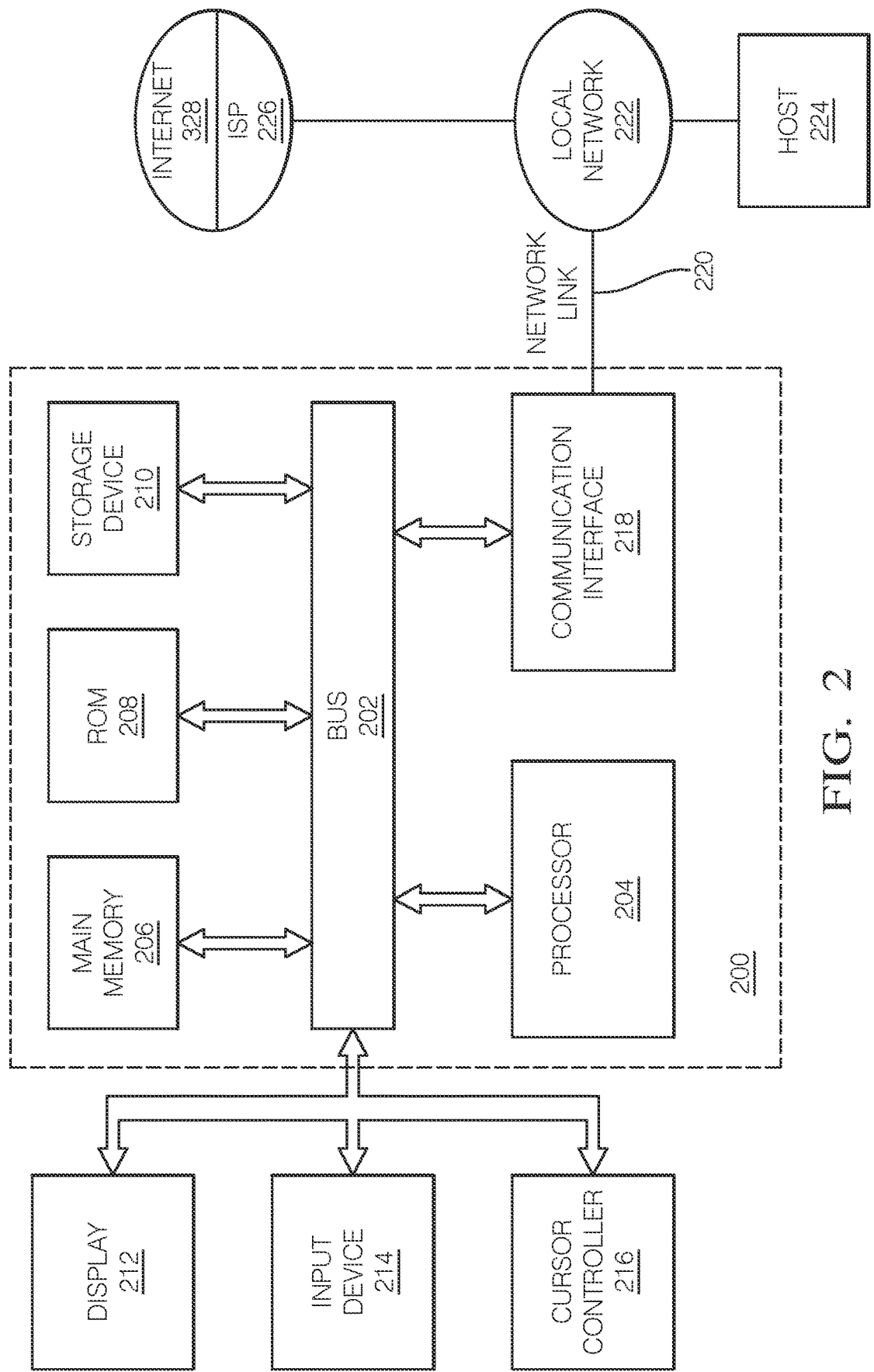
FIG. 2 illustrates a computer system.

FIG. 2 illustrates a computer system 200. In an implementation, the computer system 200 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 200 includes a bus 202 or other communication mechanism for communicating information, and a hardware processor 204 coupled with a bus 202 for processing information. The hardware processor 204 is, for example, a general-purpose microprocessor. The computer system 200 also includes a main memory 206, such as a random-access memory (RAM) or other dynamic storage device, coupled to the bus 202 for storing information and instructions to be executed by processor 204. In one implementation, the main memory 206 is used for storing temporary variables or other intermediate information during execution of instructions to be executed by the processor 204. Such instructions, when stored in non-transitory storage media accessible to the processor 204, render the computer system 200 into a special-purpose machine that is customized to perform the operations specified in the instructions.

In an embodiment, the computer system 200 further includes a read only memory (ROM) 208 or other static storage device coupled to the bus 202 for storing static information and instructions for the processor 204. A storage device 210, such as a magnetic disk, optical disk, solid-state drive, or three-dimensional cross point memory is provided and coupled to the bus 202 for storing information and instructions.

In an embodiment, the computer system 200 is coupled via the bus 202 to a display 212, such as a cathode ray tube (CRT), a liquid crystal display (LCD), plasma display, light emitting diode (LED) display, or an organic light emitting diode (OLED) display for displaying information to a computer user. An input device 214, including alphanumeric and other keys, is coupled to bus 202 for communicating information and command selections to the processor 204. Another type of user input device is a cursor controller 216, such as a mouse, a trackball, a touch-enabled display, or cursor direction keys for communicating direction information and command selections to the processor 204 and for controlling cursor movement on the display 212. This input device typically has two degrees of freedom in two axes, a first axis (e.g., x-axis) and a second axis (e.g., y-axis), that allows the device to specify positions in a plane.

According to one embodiment, the techniques herein are performed by the computer system 200 in response to the processor 204 executing one or more sequences of one or more instructions contained in the main memory 206. Such instructions are read into the main memory 206 from another storage medium, such as the storage device 210. Execution of the sequences of instructions contained in the main memory 206 causes the processor 204 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 210. Volatile media includes dynamic memory, such as the main memory 206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 202. Transmission media can also take the form of acoustic or light waves, such as those generated during radio-wave and infrared data communications.

In an embodiment, various forms of media are involved in carrying one or more sequences of one or more instructions to the processor 204 for execution. For example, the instructions are initially carried on a magnetic disk or solid-state drive of a remote computer. The remote computer loads the instructions into its dynamic memory and send the instructions over a telephone line using a modem. A modem local to the computer system 200 receives the data on the telephone line and use an infrared transmitter to convert the data to an infrared signal. An infrared detector receives the data carried in the infrared signal and appropriate circuitry places the data on the bus 202. The bus 202 carries the data to the main memory 206, from which processor 204 retrieves and executes the instructions. The instructions received by the main memory 206 may optionally be stored on the storage device 210 either before or after execution by processor 204.

The computer system 200 also includes a communication interface 218 coupled to the bus 202. The communication interface 218 provides a two-way data communication coupling to a network link 220 that is connected to a local network 222. For example, the communication interface 218 is an integrated service digital network (ISDN) card, cable modem, satellite modem, or a modem to provide a data communication connection to a corresponding type of telephone line. As another example, the communication interface 218 is a local area network (LAN) card to provide a data communication connection to a compatible LAN. In some implementations, wireless links are also implemented. In any such implementation, the communication interface 218 sends and receives electrical, electromagnetic, or optical signals that carry digital data streams representing various types of information.

The network link 220 typically provides data communication through one or more networks to other data devices. For example, the network link 220 provides a connection through the local network 222 to a host computer 224 or to a cloud data center or equipment operated by an Internet Service Provider (ISP) 226. The ISP 226 in turn provides data communication services through the world-wide packet data communication network now commonly referred to as the "Internet" 228. The local network 222 and Internet 228 both use electrical, electromagnetic or optical signals that carry digital data streams. The signals through the various networks and the signals on the network link 220 and through the communication interface 218, which carry the digital data to and from the computer system 200, are example forms of transmission media. In an embodiment, the network 220 contains one or more cloud computing systems.

The computer system 200 sends messages and receives data, including program code, through the network(s), the network link 220, and the communication interface 218. In an embodiment, the computer system 200 receives code for processing. The received code is executed by the processor 204 as it is received, and/or stored in storage device 210, or other non-volatile storage for later execution.

Autonomous Vehicle Architecture

Figure 3:
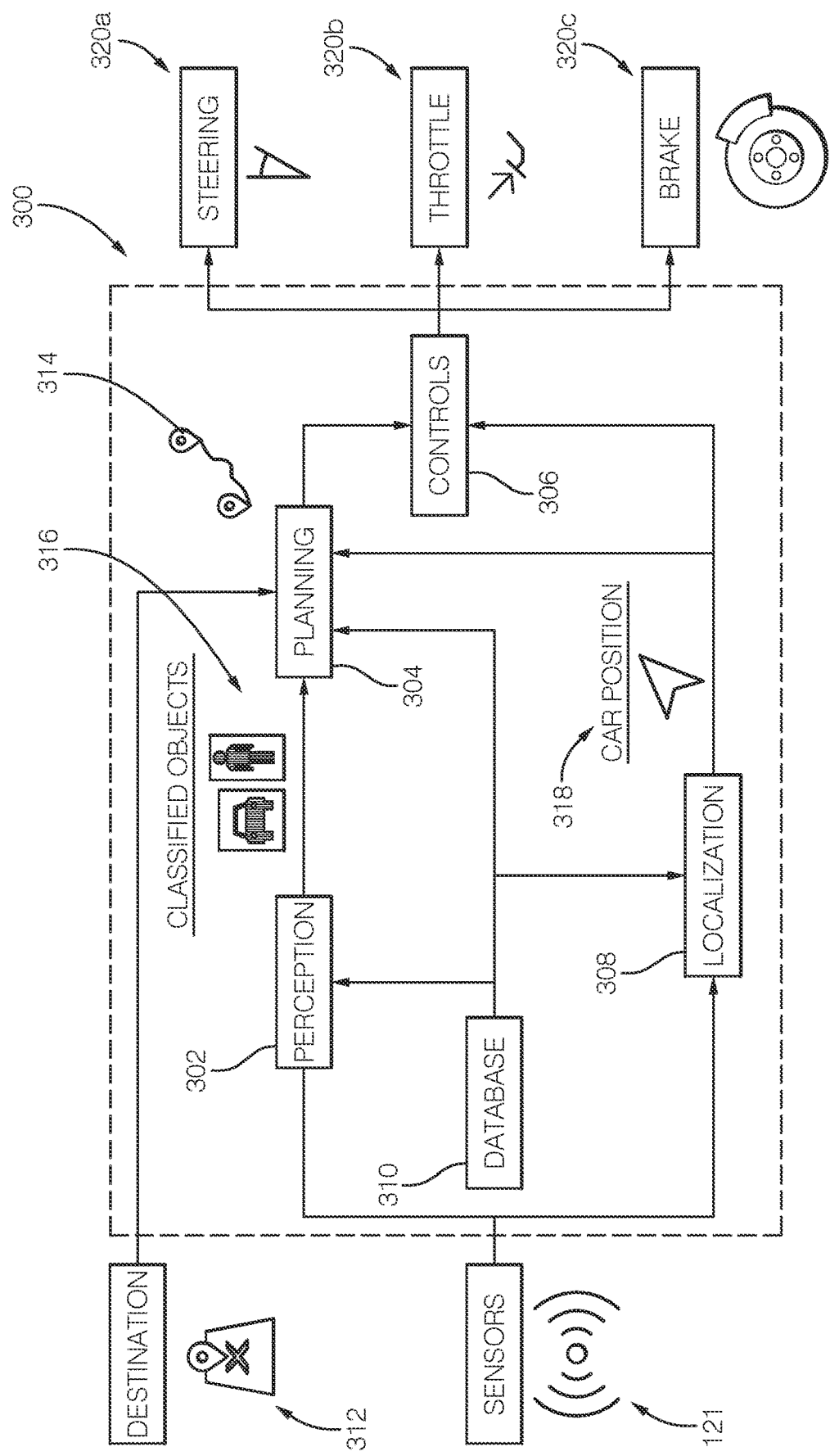
FIG. 3 shows an example architecture for an autonomous vehicle.

FIG. 3 shows an example architecture 300 for an autonomous vehicle (e.g., the AV 100 shown in FIG. 1). The architecture 300 includes a perception module 302 (sometimes referred to as a perception circuit), a planning module 304 (sometimes referred to as a planning circuit), a control module 306 (sometimes referred to as a control circuit), a localization module 308 (sometimes referred to as a localization circuit), and a database module 310 (sometimes referred to as a database circuit). Each module plays a role in the operation of the AV 100. Together, the modules 302, 304, 306, 308, and 310 may be part of the AV system 120 shown in FIG. 1. In some embodiments, any of the modules 302, 304, 306, 308, and 310 is a combination of computer software and computer hardware.

In use, the planning module 304 receives data representing a destination 312 and determines data representing a trajectory 314 (sometimes referred to as a route) that can be traveled by the AV 100 to reach (e.g., arrive at) the destination 312. In order for the planning module 304 to determine the data representing the trajectory 314, the planning module 304 receives data from the perception module 02, the localization module 308, and the database module 310.

The perception module 302 identifies nearby physical objects using one or more sensors 121, e.g., as also shown in FIG. 1. The objects are classified (e.g., grouped into types such as pedestrian, bicycle, automobile, traffic sign, etc.) and data representing the classified objects 316 is provided to the planning module 304.

The planning module 303 also receives data representing the AV position 318 from the localization module 308. The localization module 308 determines the AV position by using data from the sensors 121 and data from the database module 310 (e.g., a geographic data) to calculate a position. For example, the localization module 308 uses data from a GNSS (Global Navigation Satellite System) sensor and geographic data to calculate a longitude and latitude of the AV. In an embodiment, data used by the localization module 308 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 306 receives the data representing the trajectory 314 and the data representing the AV position 318 and operates the control functions 320a-c (e.g., steering, throttling, braking, ignition) of the AV in a manner that will cause the AV 100 to travel the trajectory 314 to the destination 312. For example, if the trajectory 314 includes a left turn, the control module 306 will operate the control functions 320a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 4:
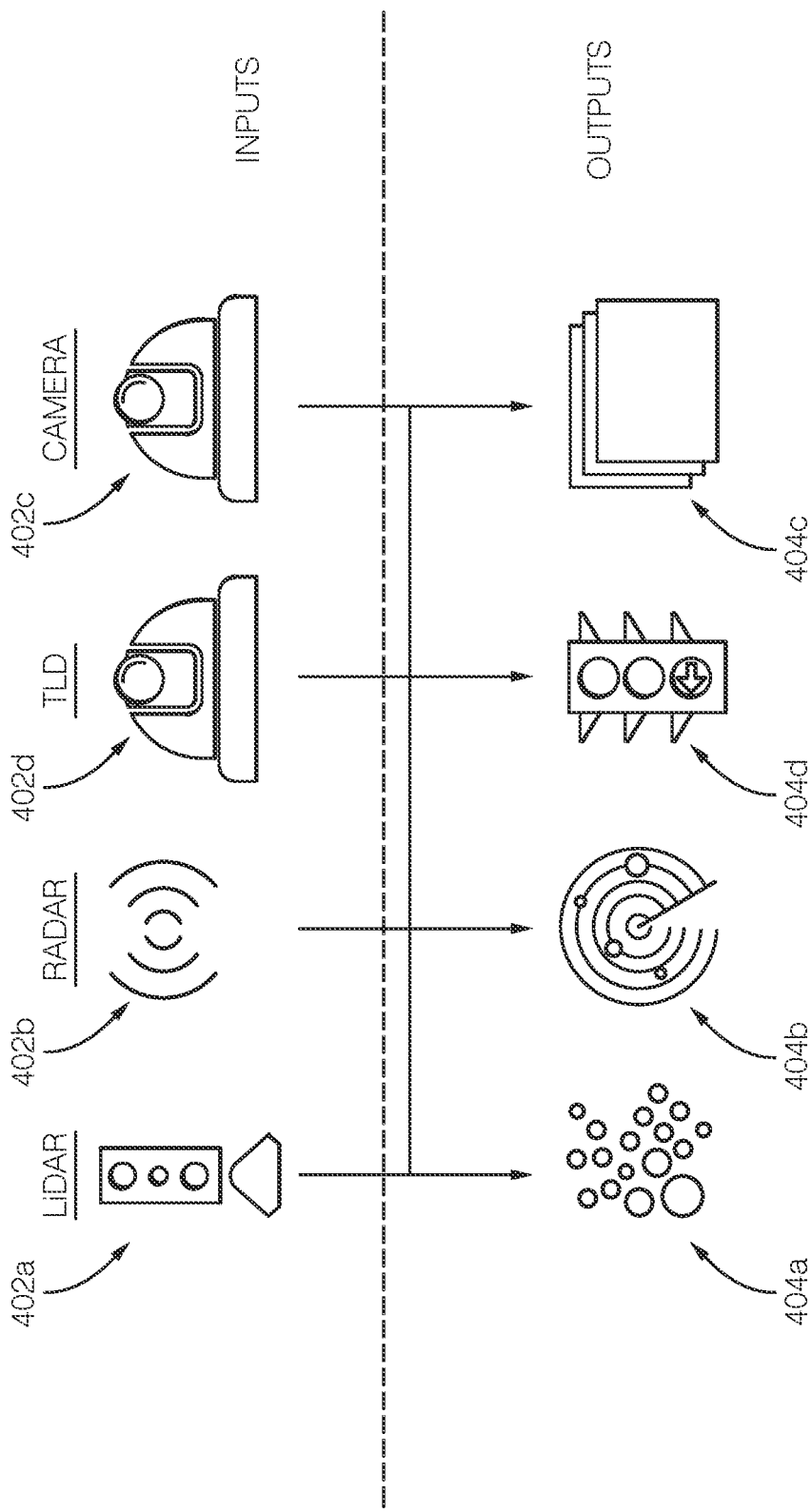
FIG. 4 shows an example of inputs and outputs that may be used by a perception module.

FIG. 4 shows an example of inputs 402a-d (e.g., sensors 121 shown in FIG. 1) and outputs 404a-d (e.g., sensor data) that is used by the perception module 302 (FIG. 3). One input 402a is a LiDAR (Light Detection And Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 404a. For example, LiDAR data is collections of 3D or 2D points (also known as a point clouds) that are used to construct a representation of the environment 190.

Another input 402b is a radar system. Radar is a technology that uses radio waves to obtain data about nearby physical objects. Radars can obtain data about objects not within the line of sight of a LiDAR system. A radar system 402b produces radar data as output 404b. For example, radar data are one or more radio frequency electromagnetic signals that are used to construct a representation of the environment 190.

Another input 402c is a camera system. A camera system uses one or more cameras (e.g., digital cameras using a light sensor such as a charge-coupled device [CCD]) to obtain information about nearby physical objects. A camera system produces camera data as output 404c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 402d is a traffic light detection (TLD) system. A TLD system uses one or more cameras to obtain information about traffic lights, street signs, and other physical objects that provide visual navigation information. A TLD system produces TLD data as output 404d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 404*a-d* are combined using a sensor fusion technique. Thus, either the individual outputs 504*a-d* are provided to other systems of the AV 100 (e.g., provided to a planning module 304 as shown in FIG. 3), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Autonomous Vehicle Control

Figure 5:
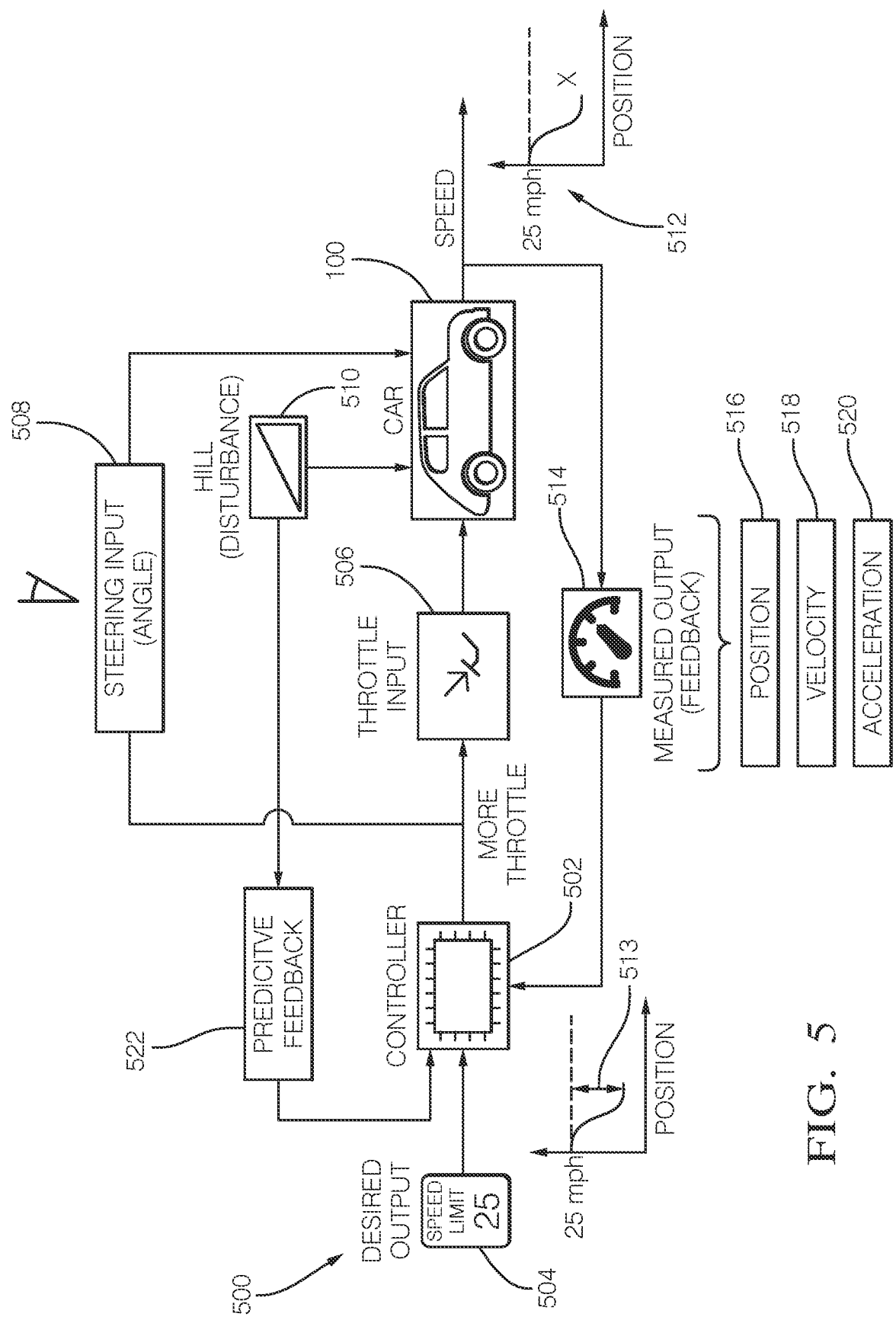
FIG. 5 shows a block diagram of the inputs and outputs of a control module.

FIG. 5 shows a block diagram 500 of the inputs and outputs of a control module 306 (e.g., as shown in FIG. 3). A control module operates in accordance with a controller 502 which includes, for example, one or more processors (e.g., one or more computer processors such as microprocessors or microcontrollers or both) similar to processor 204, short-term and/or long-term data storage (e.g., memory random-access memory or flash memory or both) similar to main memory 206, ROM 208, and storage device 210, and instructions stored in memory that carry out operations of the controller 502 when the instructions are executed (e.g., by the one or more processors).

In an embodiment, the controller 502 receives data representing a desired output 504. The desired output 504 typically includes a velocity, e.g., a speed and a heading. The desired output 504 can be based on, for example, data received from a planning module 304 (e.g., as shown in FIG. 3). In accordance with the desired output 504, the controller 502 produces data usable as a throttle input 506 and a steering input 508. The throttle input 506 represents the magnitude in which to engage the throttle (e.g., acceleration control) of an AV 100, by engaging the steering pedal, or engaging another throttle control, to achieve the desired output 504. In some examples, the throttle input 506 also includes data usable to engage the brake (e.g., deceleration control) of the AV 100. The steering input 508 represents a steering angle, e.g., the angle at which the steering control (e.g., steering wheel, steering angle actuator, or other functionality for controlling steering angle) of the AV should be positioned to achieve the desired output 504.

In an embodiment, the controller 502 receives feedback that is used in adjusting the inputs provided to the throttle and steering. For example, if the AV 100 encounters a disturbance 510, such as a hill, the measured speed 512 of the AV 100 is lowered below the desired output speed. In an embodiment, any measured output 514 is provided to the controller 502 so that the necessary adjustments are performed, e.g., based on the differential 513 between the measured speed and desired output. The measured output 514 includes measured position 516, measured velocity 518, (including speed and heading), measured acceleration 520, and other outputs measurable by sensors of the AV 100.

In an embodiment, information about the disturbance 510 is detected in advance, e.g., by a sensor such as a camera or LiDAR sensor, and provided to a predictive feedback module 522. The predictive feedback module 522 then provides information to the controller 502 that the controller 502 can use to adjust accordingly. For example, if the sensors of the AV 100 detect ("see") a hill, this information can be used by the controller 502 to prepare to engage the throttle at the appropriate time to avoid significant deceleration.

Figure 6:
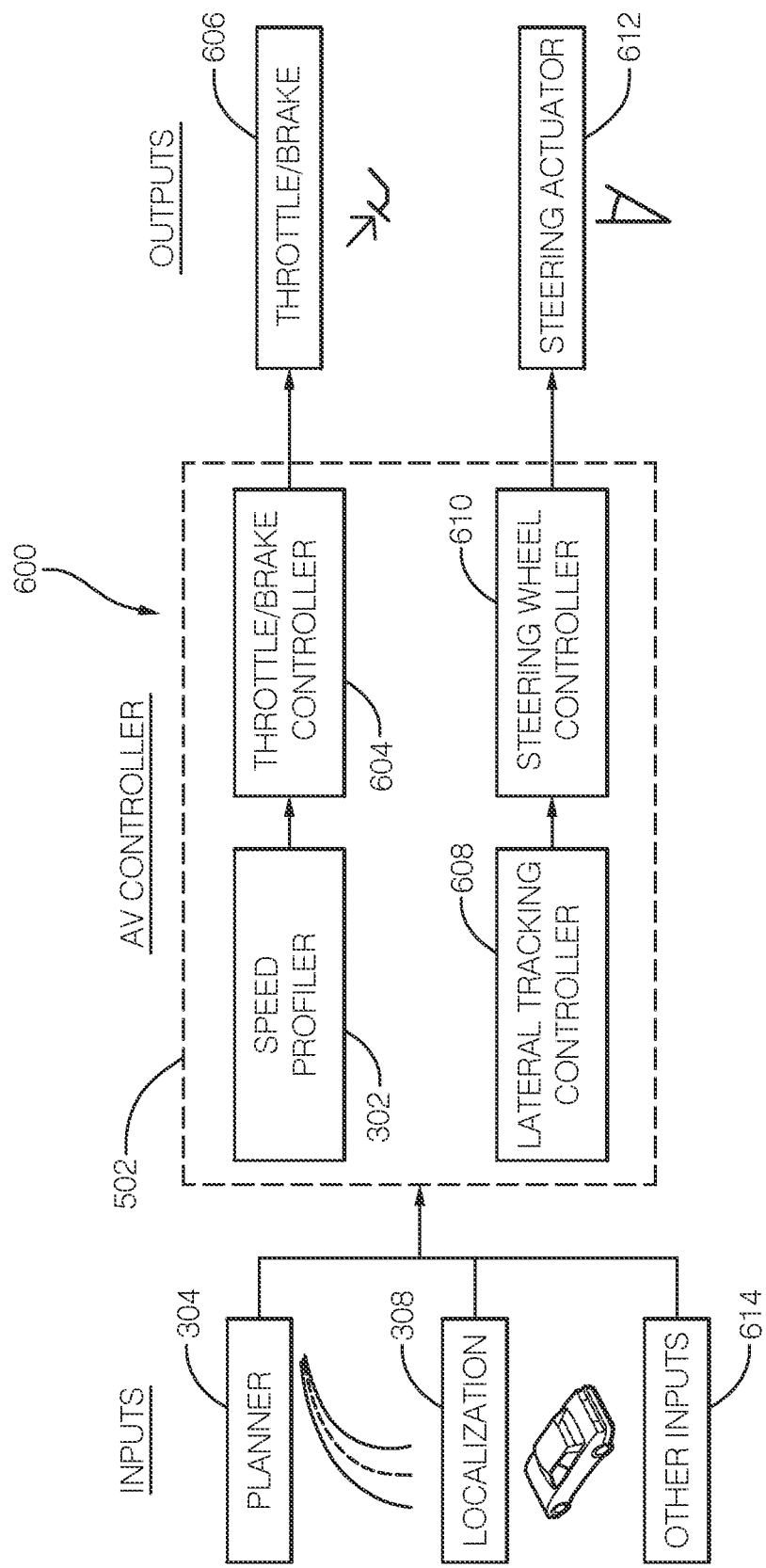
FIG. 6 shows a block diagram of the inputs, outputs, and components of a controller.

FIG. 6 shows a block diagram 600 of the inputs, outputs, and components of the controller 502. The controller 502 has a speed profiler 602 which affects the operation of a throttle/brake controller 604. For example, the speed profiler 602 instructs the throttle/brake controller 604 to engage acceleration or engage deceleration using the throttle/brake 606 depending on, e.g., feedback received by the controller 502 and processed by the speed profiler 602.

The controller 502 also has a lateral tracking controller 608 which affects the operation of a steering controller 610. For example, the lateral tracking controller 608 instructs the steering controller 610 to adjust the position of the steering angle actuator 612 depending on, e.g., feedback received by the controller 502 and processed by the lateral tracking controller 608.

The controller 502 receives several inputs used to determine how to control the throttle/brake 606 and steering angle actuator 612. A planning module 304 provides information used by the controller 502, for example, to choose a heading when the AV 100 begins operation and to determine which road segment to traverse when the AV 100 reaches an intersection. A localization module 308 provides information to the controller 502 describing the current location of the AV 100, for example, so that the controller 502 can determine if the AV 100 is at a location expected based on the manner in which the throttle/brake 606 and steering angle actuator 612 are being controlled. In an embodiment, the controller 502 receives information from other inputs 614, e.g., information received from databases, computer networks, etc.

Remotely Monitoring and Controlling the Operation of Autonomous Vehicles

In some embodiments, a computer system controls the operation of one or more autonomous vehicles (e.g., a fleet of autonomous vehicles). For example, a computer system can deploy autonomous vehicles to one or more locations or regions, assign transportation tasks to each of the autonomous vehicles (e.g., pick up and transport passengers, pick up and transport cargo, etc.), provide navigation instructions to each of the autonomous vehicles (e.g., provide a route or path between two locations, provide instructions to traverse objects in proximity to the autonomous vehicle, etc.), assign maintenance tasks to each of the autonomous vehicles (e.g., charge their batteries at charging stations, receive repairs at a service station, etc.), and/or assign other tasks to each of the autonomous vehicles.

Further, a computer system can be used the monitor the operation of autonomous vehicles. For example, a computer system can collect information from each of the autonomous vehicles (e.g., vehicle telemetry data, such as data regarding a vehicle's speed, heading, status, or other aspects of a vehicle's operation), process the collected information, and present the information to one or more users (e.g., in the form of an interactive graphical user interface) such that the users can keep informed regarding the operation of the autonomous vehicles.

Electrical Interconnections Between Components of an Autonomous Vehicle

Electrical signals can be transmitted to and/or from electronic components of the AV 100 using electrically conductive cables or wires. As an example, a cable carries electrical signals from one electrical component to another to facilitate the transmission of data, instructions, or other information between the electrical components. As another example, a cable carries electrical power from a power source to an electrical component to support the operation of the electrical component. In some embodiments, one or more cables are used to interconnect some or all of the electronic components shown in FIGS. 1-6 to facilitate performance of the functions described herein.

In an embodiment, cable connectors provide a physical and electrical interface between a cable and another component. As an example, a cable connector includes a first portion that physically couples with one or more conductors of a cable, and a second portion that physically couples with one or more conductors of another component (e.g., another cable or electronic component). Electrical signals from the cable are transmitted to the other component via the cable connector.

Further, in an embodiment, a cable connector includes one or more physical features that facilitate physical and electrical interconnection between the cable and the other component. As an example, a cable connector is attached on one end to a cable, and includes on the other end a plug configured to insert into a corresponding receptacle of a component, such that the cable is securely attached to the component. As another example, a cable connector is attached on one end to a cable, and includes on the other end a receptacle configured to receive a corresponding plug of a component, such that the cable is securely attached to the component.

In an embodiment, a single cable connector facilitates multiple interconnections concurrently. For example, a single cable connector facilitates multiple interconnections between multiple discrete conductors of a cable and multiple corresponding conductors of another component. This can be beneficial, for instance, in simplifying the process of assembling and/or maintaining an electrical system.

Figure 7A:
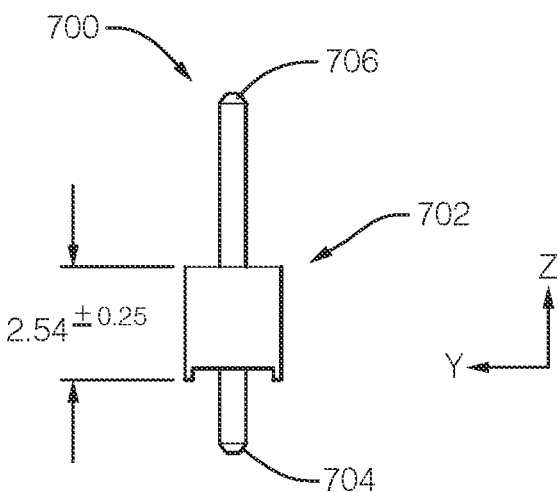
FIGS. 7A-7C show an example cable connector.
Figure 7B:
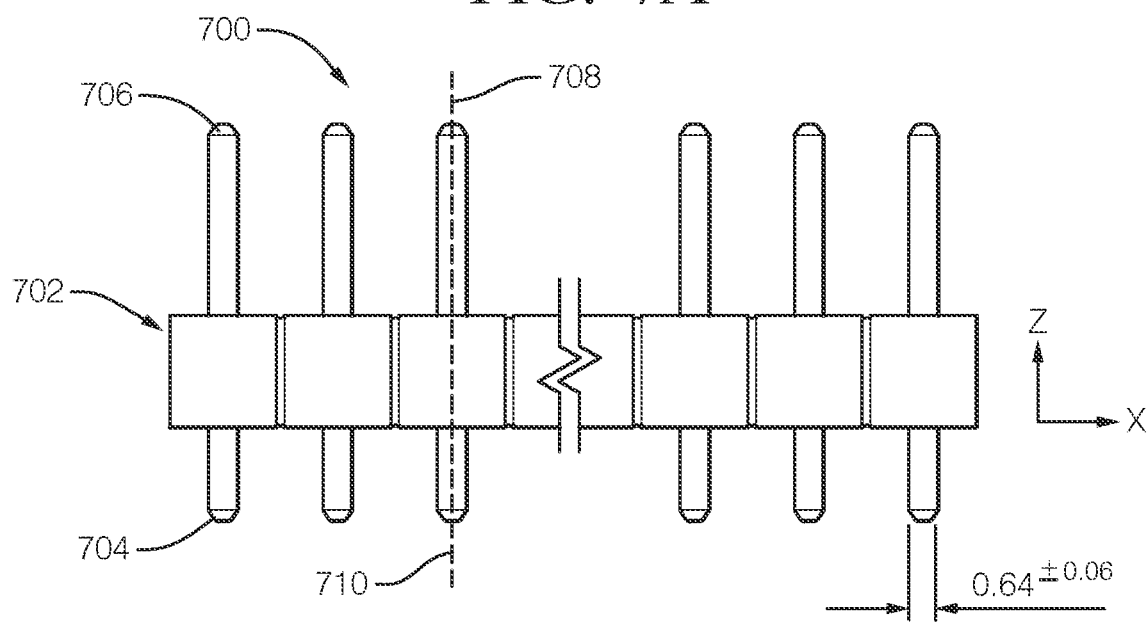
Figure 7C:
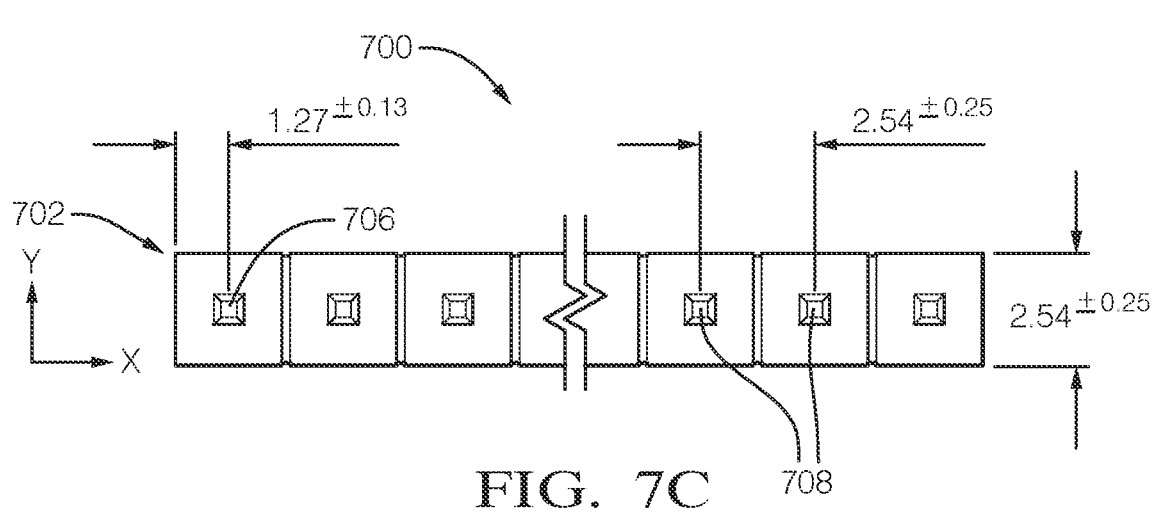

In an embodiment, a physical environment is designed to accommodate a particular number of interconnections within a particular physical space. As an example, a particular standardized design convention for automotive electrical systems specifies that cable connectors include one or more physical cells (e.g., repeating sections, portions, or segments), each having particular physical dimensions, and each accommodating a single respective electrical interconnection (e.g., an interconnection between a single conductor with another single conductor). For instance, FIGS. 7A-7C shows an example cable connector 700 according to a side view, front view, and top view, respectively. The cable connector 700 includes a number of cells 702, each having a respective input pin 704 for attachment to a first electrical component, and an output pin 706 for attachment to a second electronic component. As an example, one or more of the input pins 704 can be attached to respective conductors of a cable, and one or more of the output pins 706 can be inserted into one or more corresponding sockets of another electronic device.

In an embodiment, some or all of the cells are similar or substantially identical to one another with respect to their physical dimensions. For instance, as shown in FIGS. 7A-7C, a particular standardized design convention specifies that each cell has a particular length, width, and height (e.g., approximately 2.54 mm×2.54 mm×2.54 mm in the x-direction, y-direction, and z-direction, respectively). Further, the standardized design convention specifies that the electrical contacts of each cell (e.g., the input pins 704 and the output pins 706) be positioned in a particular manner with respect to the cell 702 (e.g., centered with respect to the x-direction and y-direction). Further, the standardized design convention specifies that the electrical contacts of the cells be spaced from one another by a particular distance. As an example, as shown in FIGS. 7A-7C, the distance between the central axes 708 of adjacent input pins 704 is approximately 2.54 mm (e.g., 2.54 mm±10%). As another example, the distance between the central axes 710 of adjacent output pins 706 is approximately 2.54 mm (e.g., 2.54 mm±10%).

Figure 8:
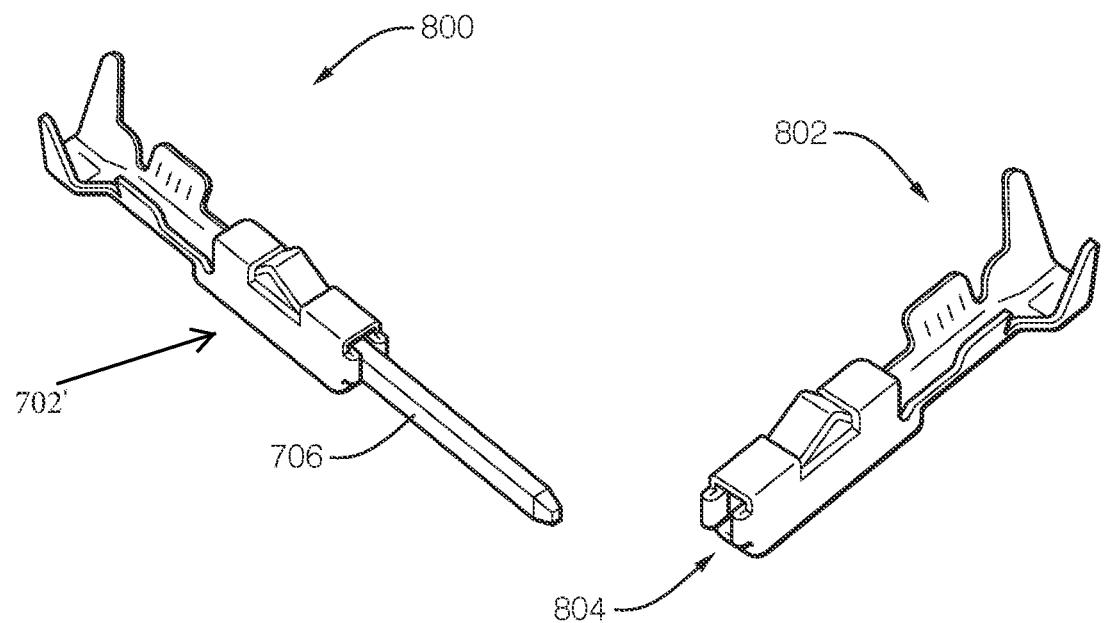
FIG. 8 shows example cable connectors, each having a single cell.
Figure 9:
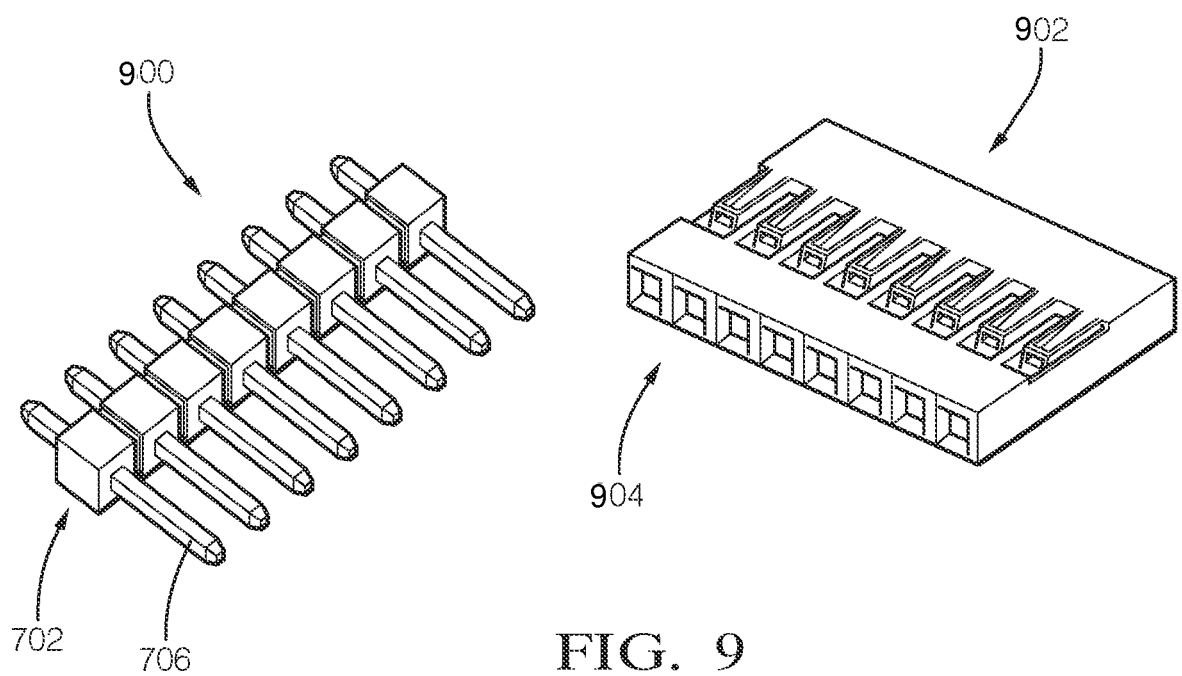
FIG. 9 shows example cable connectors, each having multiple cells.

In an embodiment, cable connectors include one or more cells. For example, as shown in FIG. 8, a cable connector includes a single cell 702' for facilitating a single discrete electrical interconnection with a corresponding cable connector 802 (e.g., via a socket 804 configured to receive the output pin 706 of the cable connector 802). As another example, as shown in FIG. 9, a cable connector 900 includes multiple similar or substantially identical cells 702 for facilitating multiple discrete electrical interconnections with a corresponding cable connector 902 (e.g., via multiple sockets 904 configured to receive the output pins 706 of the cable connector 902).

One or more of the cable connectors described herein can facilitate a greater number of interconnections within a particular physical space (e.g., two, three, or more). For example, referring to FIGS. 7A-7C, although a particular standardized design convention specifies that each cell 702 have a particular length, width, and height, and that each cell provides a single respective electrical interconnection, a cable connector instead provides multiple electrical interconnections (e.g., two, three, or more) within a physical space similar to or substantially identical to that of a single cell 702.

This can be beneficial, for instance, as it enables a greater number of interconnections to be made within a particular physical space and/or using few physical materials. Accordingly, an electrical system can be implemented in a more space-efficient and/or weight-efficient manner. Further, this enables electrical systems to be implemented using pre-existing physical environments and/or design conventions (e.g., having standardized physical dimensions and/or components), thereby reducing the cost and time associated with designing and implementing the overall system.

FIG. 10A shows cross-sectional views of an example cable connector 1000 for facilitating physical and electrical interconnections between electronic components in autonomous vehicles. The cable connector 1000 includes a first portion 1002 configured to accept a cable. The cable connector 1000 also incudes a second portion 1006 configured to couple with the cable, and provide a physical and electrical interface for the cable with another component (e.g., another cable connector, cable, or electronic component).

The first portion 1002 defines a cavity 1008 (within a housing 1010 of the cable connector 1000). The cavity 1008 has dimensions suitable for accommodating a cable. For example, the length and width of the cavity 1008 (e.g., with respect to the x and y directions, respectively) is greater than or equal to the length and width of at least a portion of a cable (e.g., an outer periphery of the cable), such that at least a portion of the cable can be inserted into the cavity 1008.

The second portion 1006 includes a mounting structure 1012 (e.g., having one or more physical dividers, walls, or other structural components) positioned within the housing 1010. The mounting structure 1012 defines a first cross-sectional void region 1014a and a second cross-sectional void region 1014b (e.g., separated, at least in part, by the mounting structure 1012). A first electrical prong 1016a

(e.g., a fork or arrangement of pins) is mounted to the mounting structure 1012, such that it is disposed, in part, in the first cross-sectional void region 1014a and extends from the second portion 1004. Further, a second electrical prong 1016b (e.g., another fork or arrangement of pins) is mounted to the mounting structure 1012, such that is disposed, in part, in the second cross-sectional void region 1014b and extends from the second portion 1004.

The first electrical prong 1016a includes a base portion 1018a, a first prong portion 1020a projecting from the base portion 1018a, and a second prong portion 1022a projecting from the base portion 1018a. In an embodiment, the base portion 1018a is substantially straight along its length (e.g., extending parallel to a central axis 1024 of the cable connector 1000. In an embodiment, the first prong portion 1020a is also substantially straight along its length (e.g., extending parallel to the central axis 1024 of the cable connector 1000). In an embodiment, as shown in in FIG. 10A, the first portion 1020a and the base portion 1018a share a common axis of extension (e.g., such that the length of the base portion 1018a is extended by the first prong portion 1020a along a common axis). Further, in an embodiment, the first prong portion 1020a terminates at a sharpened point 1026a (e.g., in the form of a substantially conical or pyramidal structure).

Further, in an embodiment, the second prong portion 1022a defines a curved path. For example, as shown in FIG. 10A, the first prong portion 1020a includes a concave portion (e.g., defining a path bending towards the first prong portion 1020a), and a convex portion (e.g., defining a path bending away from the first prong portion 1020a). Further, the second prong portion 1022a terminates at a sharpened point 1028a (e.g., in the form of a substantially conical or pyramidal structure).

The second electrical prong 1016b is shown in separately in FIG. 10B. The second electrical prong 1016b includes a respective base portion 1018b, a respective first prong portion 1020b projecting from the base portion 1018b, and a respective second prong portion 1022b projecting from the base portion 1018b.

In an embodiment, the second electrical prong 1016b is symmetric to the first electrical prong 1016a with respect to a central axis 1024 of the cable connector 1000. For example, as shown in FIG. 10B, the base portion 1018b is substantially straight along its length (e.g., extending parallel to a central axis 1024 of the cable connector 1000. In an embodiment, the first prong portion 1020b is also substantially straight along its length (e.g., extending parallel to the central axis 1024 of the cable connector 1000). As shown in in FIG. 10B, the first prong portion 1020b and the base portion 1018b share a common axis of extension (e.g., such that the length of the base portion 1018b is extended by the first prong portion 1020b along a common axis). Further, the first prong portion 1020b terminates at a sharpened point 1026b (e.g., in the form of a conical or pyramidal structure).

Further, in an embodiment, the second prong portion 1022b defines a curved path. For example, as shown in FIG. 10B, the first prong portion 1020b includes a concave portion (e.g., defining a path bending towards the first prong portion 1020b), and a convex portion (e.g., defining a path bending away from the first prong portion 1020b). Further, the second prong portion 1022b terminates at a sharpened point 1028b (e.g., in the form of a conical or pyramidal structure).

In an embodiment, the first electrical prong 1016a and the second electrical prong 1016b are composed of one or more electrically conductive materials (e.g., copper, aluminum, silver, gold, or other conductive materials, or combination thereof). In an embodiment, the first electrical prong 1016a and the second electrical prong 1016b are flexible (e.g., such that they bend when an external force is applied to them). In an embodiment, the first electrical prong 1016a and the second electrical prong 1016b exhibit shape memory (e.g., such that they return to a particular shape or physical configuration after the exterior force is removed).

The connector 1000 is configured to couple with a cable, and provide a physical and electrical interface for the cable with another component (e.g., another cable connector, cable, or electronic component). As an example, FIG. 11A shows a cable 1100. The cable 1100 can be used, for instance, to transmit electrical signals to and/or from electronic components of the AV 100.

The cable 1100 includes two conductive strands 1102a and 1102b extending along a length of the cable 1100. The conductive strands 1102a and 1102b can be used, for example, to carry electrical signals along the length of the cable 1100. In an embodiment, the conductive strands 1102a and 1102b are composed of one or more electrically conductive materials (e.g., copper, aluminum, silver, gold, or other conductive materials, or combination thereof).

The conductive strands 1102a and 1102b are separated and electrically isolated from one another by a central insulative strand 1104 disposed between them and extending along the length of the cable 1100. The cable 1100 also includes one or more additional insulative strands 1106 extending along the length of the cable (e.g., distributed along a periphery of the central insulative strand 1104 to further separate and electrical isolate the conductive strands 1102a and 1102b from one another. In an embodiment, the insulative strands 1104 and 1106 are composed of one or more electrically insulative materials (e.g., plastic, rubber, fiber, or other electrically insulative materials, or combination thereof).

The conductive strands 1102a and 1102b and the insulative strands 1104 and 1106 are enclosed, at least in part, by an insulative jacket 1108. In an embodiment, the insulative jacket 1108 is composed of one or more electrically insulative materials (e.g., plastic, rubber, or other electrically insulative materials, or combination thereof). Portions of the insulative jacket 1108 can be removed to expose the conductive strands 1102a and 1102b, the insulative strand and/or the insulative strand 1106 (e.g., by "stripping" portions of insulative jacket 1108 using a stripping tool).

Additional information regarding cables can be found in U.S. application Ser. No. 16/885,567, filed on May 28, 2020, entitled "Communications Cables for Autonomous Vehicles," which is incorporated into this description by reference in its entirety.

In an embodiment, as shown in FIG. 11B, the exposed portions of the conductive strands 1102a and 1102b and the insulative strand 1104 are inserted into the cavity 1008 defined by the first portion 1002 of the cable connector 1000, and secured to the cable connector 1000. As an example, the exposed portion of the conductive strand 1102a are secured to the mounting structure 1102 and/or the first electrical prong 1016a (e.g., using solder, adhesive, clamps, or brackets), such that the conductive strand 1102a directly contacts the first electrical prong 1016a (e.g., along the base portion 1018a). Similarly, the exposed portion of the conductive strand 1102b are secured to the mounting structure 1102 and/or the second electrical prong 1016b (e.g., using solder, adhesive, clamps, or brackets), such that the conductive strand 1102b directly contacts the second electrical prong 1016b (e.g., along the base portion 1018a). Further, the insulative strand 1104 is inserted into a recess 1110 defined along a central axis of the mounting structure 1012.

In an embodiment, the cable connector 1000 physically and electrically interconnects with another cable connector similar or substantially identical to the cable connector 1000, such that electrical signals transmitted through the cable 1100 are transmitted to another electronic device and/or the cable 1100 receives electrical signals from another electronic device. For example, as shown in FIG. 11B, a second cable 1100' is coupled to a second cable connector 1000'. In an embodiment, the cable 1100' is similar or substantially identical to the cable 1100. Further, the cable connector 1000' is similar or substantially identical to the cable connector 1000. For example, the cable connector 1000' also includes a first portion 1002' configured to accept a cable, and a second portion 1006' configured to couple with the cable 1100', and provides a physical and electrical interface for the cable 1100'. Further, the first portion 1002' defines a cavity 1008' for accommodating the cable 1100'. Further, the second portion 1006' includes a mounting structure 1012' defining first and second cross-sectional void regions, and first and second electrical prongs 1016a' and 1016b' disposed, in part, in the cross-sectional void regions and extending from the second portion 1004'. Due to the similarity between the cable connectors 1000 and 1000', for ease of illustration, some of the components of the cable connector 1000' have not been separately labeled with respect to FIG. 11B.

Figure 11C:
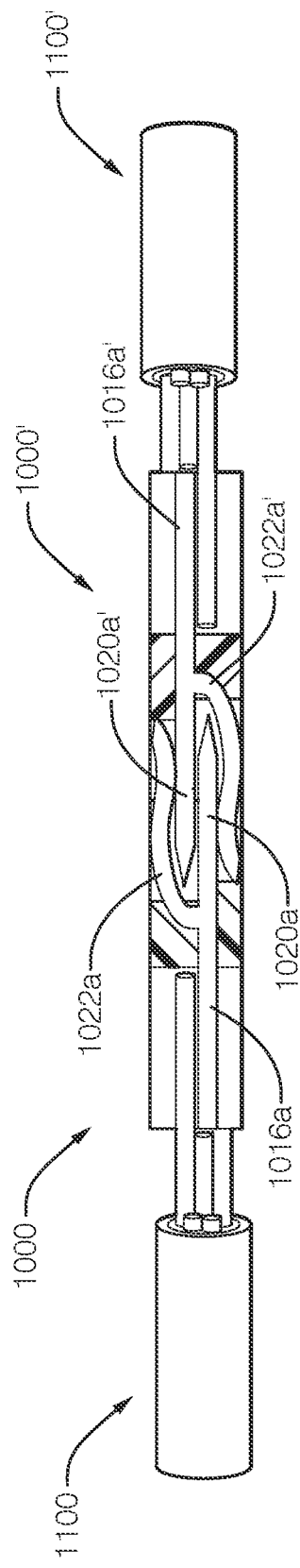
FIGS. 11C and 11D show a physical and electrical coupling between two example cable connectors.

In an embodiment, as shown in FIG. 11C, the electrical prong 1016a of the cable connector 1000 and the electrical prong 1016a' of the cable connector 1000' are configured to physically and electrically couple with one another, such that electrical signals from a conductive strand of one cable is electrically coupled to a corresponding conductive strand of the other cable. Similarly, the electrical prong 1016b of the cable connector 1000 and the electrical prong 1016b' of the cable connector 1000' are configured to physically and electrically couple with one another, such that electrical signals from another conductive strand of one cable is electrically coupled to another corresponding conductive strand of the other cable Further, as shown in FIG. 11C, the electrical prongs are configured to couple to one another according to a hermaphroditic configuration, and are configured to reversibly secure to other another through a friction and/or press fit. For example, the first prong portion 1020a of the electrical prong 1016a is inserted between the first prong portion 1020a' and the second prong portion 1022a' of the electrical prong 1016a'. Further, the second prong portion 1022a' of the electrical prong 1016a' bends to accept the first prong portion 1020a of the electrical prong 1016a. Further, the convex portion of the second prong portion 1022a' presses against the first prong portion 1020a of the electrical prong 1016a (e.g., due to a spring force or a shape memory of the second prong portion 1022a'), such that the electrical prongs 1016a and 1016b are held in place through friction.

Similarly, the first prong portion 1020a' of the electrical prong 1016a' is inserted between the first prong portion 1020a and the second prong portion 1022a of the electrical prong 1016a. Further, the second prong portion 1022a of the electrical prong 1016a bends to accept the first prong portion 1020a' of the electrical prong 1016a'. Further, the convex portion of the second prong portion 1022a presses against the first prong portion 1020a' of the electrical prong 1016a' (e.g., due to a spring force or a shape memory of the second prong portion 1022a), such that the electrical prongs 1016a and 1016b are held in place through friction.

In an embodiment, the electrical prong 1016b of the cable connector 1000 and the electrical prong 1016b' of the cable connector 1000' are configured to couple to one another according to a similar hermaphroditic configuration.

Figure 11D:
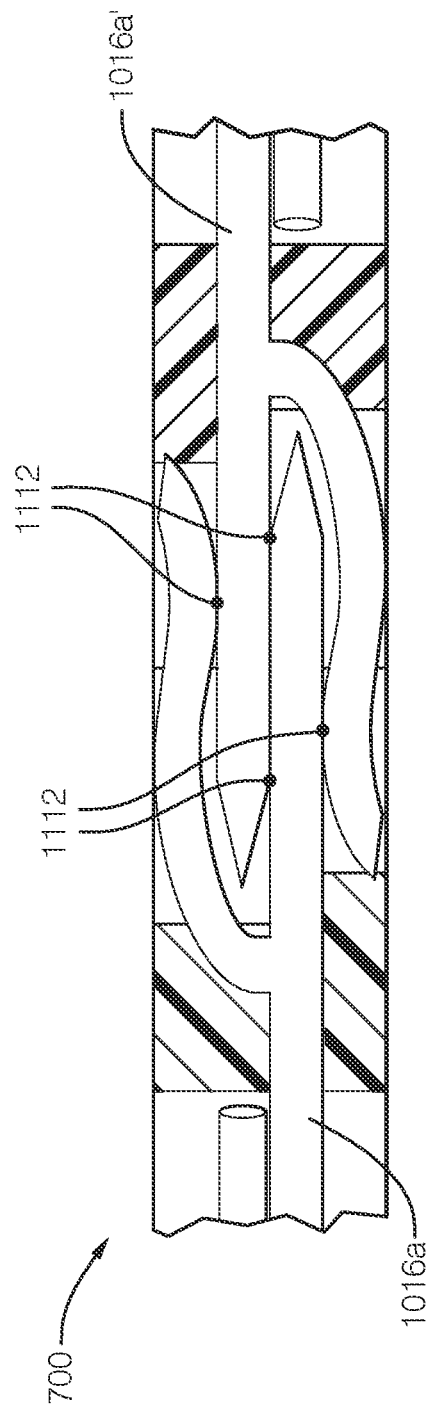
Figure 12A:
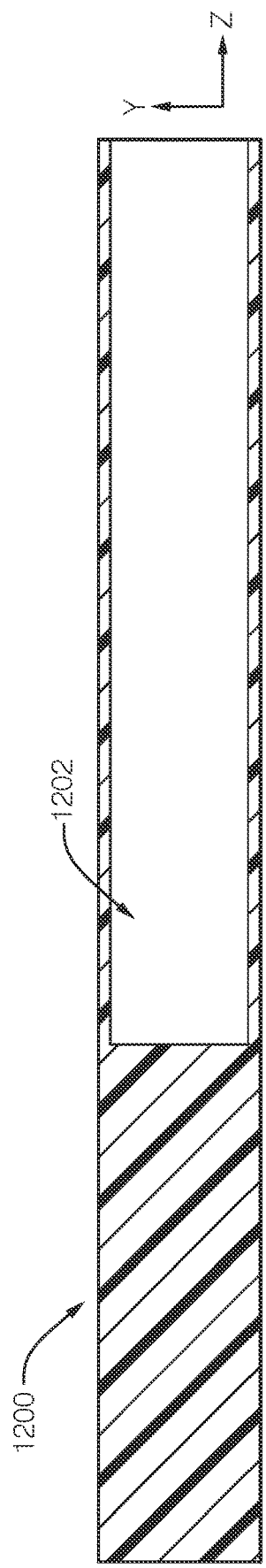
FIG. 12A shows an example outer housing.
Figure 12B:
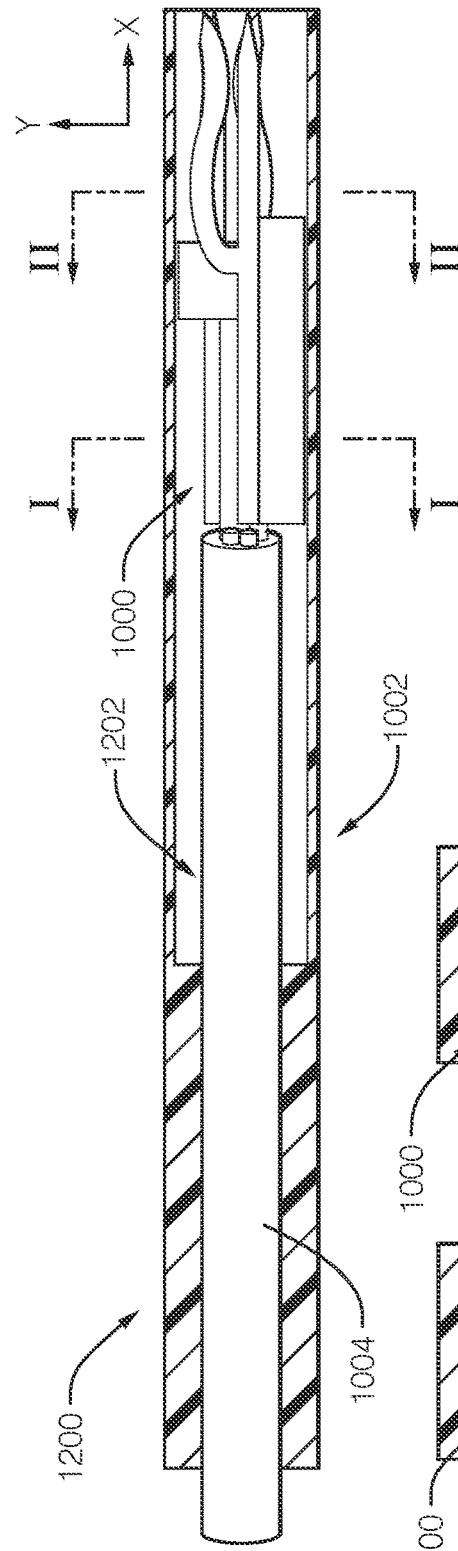
FIG. 12B shows an example cable connector disposed in an outer housing.
Figure 12B:
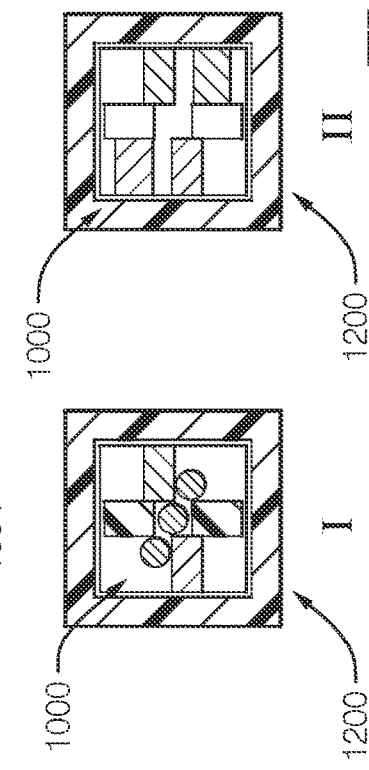

This hermaphroditic coupling configuration can provide various benefits. For example, FIG. 11D shows a detail view of the interconnection between the electrical prongs 1016a and 1016a'. For ease of illustration, other portions of the cable connectors 1000 and 1000' have been omitted. As shown in FIG. 11D, the hermaphroditic coupling configuration enables the electrical prongs 1016a and 1016a' to directly contact one another at several points 1112 between them. This enables the electrical prongs 1016a and 1016a' to maintain consistent physical and electrical interconnection, even despite the application of certain external forces (e.g., vibrations). Further, this enables the electrical prongs 1016a and 1016a' to be reversibly coupled to one another. For example, the electrical prongs 1016a and 1016a' can be inserted into one another (e.g., by pushing the cable connectors together) to provide a physical and electrical interconnection between two cables. Further, the electrical prongs 1016a and 1016a' can be separated from one another (e.g., by pulling the cable connectors apart) to reverse the interconnection without damaging the cable As described herein, a physical environment may be designed to accommodate a particular number of interconnections within a particular physical space. One or more of the cable connectors described herein can facilitate a greater number of interconnections within the same physical space. As an example, FIG. 12A shows an outer housing 1200 having a cavity 1202. The cavity 1202 has physical dimensions suitable for accommodating cable connectors of a particular size. In an embodiment, the cavity 1202 has a particular standardized height, width, and/or depth (e.g., for accommodating a cable connector having a corresponding standardized height, width, and/or depth). As an example, the cavity has a width (e.g., in the x-direction) of approximately 2.54 mm (e.g., 2.54±10%) or larger and a height (e.g., in the y-direction) of approximately 2.54 mm (e.g., 2.54±10%) or larger, to accommodate a cable connector having a width and height of approximately 2.54 mm (e.g., 2.54±10%) within it (e.g., a cable connector 800 for facilitating a single discrete electrical interconnection, as shown in FIG. 8). In an embodiment, as shown in FIG. 12B, one or more of the cable connectors described herein (e.g., the cable connector 1000 shown in FIG. 1000) are positioned within the cavity 1202, such that additional electrical interconnections (e.g., two) can be provided within the same physical space. As a greater number of interconnections to be made within a particular physical space and/or using few physical materials, an electrical system can be implemented in a more space-efficient and/or weight-efficient manner. Further, this enables electrical systems to be implemented using pre-existing physical environments and/or design conventions (e.g., having standardized physical dimensions and/or components), thereby reducing the cost and time associated with designing and implementing the overall system.

In the examples shown in FIGS. 10A, 11B, 11C, and 12B, a cable connector includes a single cell or section (e.g., providing two physical and electrical interconnections within the cell or section). However, a cable connector need not be limited to a single cell or section. In an embodiment, a cable connector includes multiple cells or sections (e.g., two, three, four, or more). Further, in an embodiment, each cell or section provides two or more physical and electrical interconnections within it (e.g., rather than a single interconnection).

Figure 13:
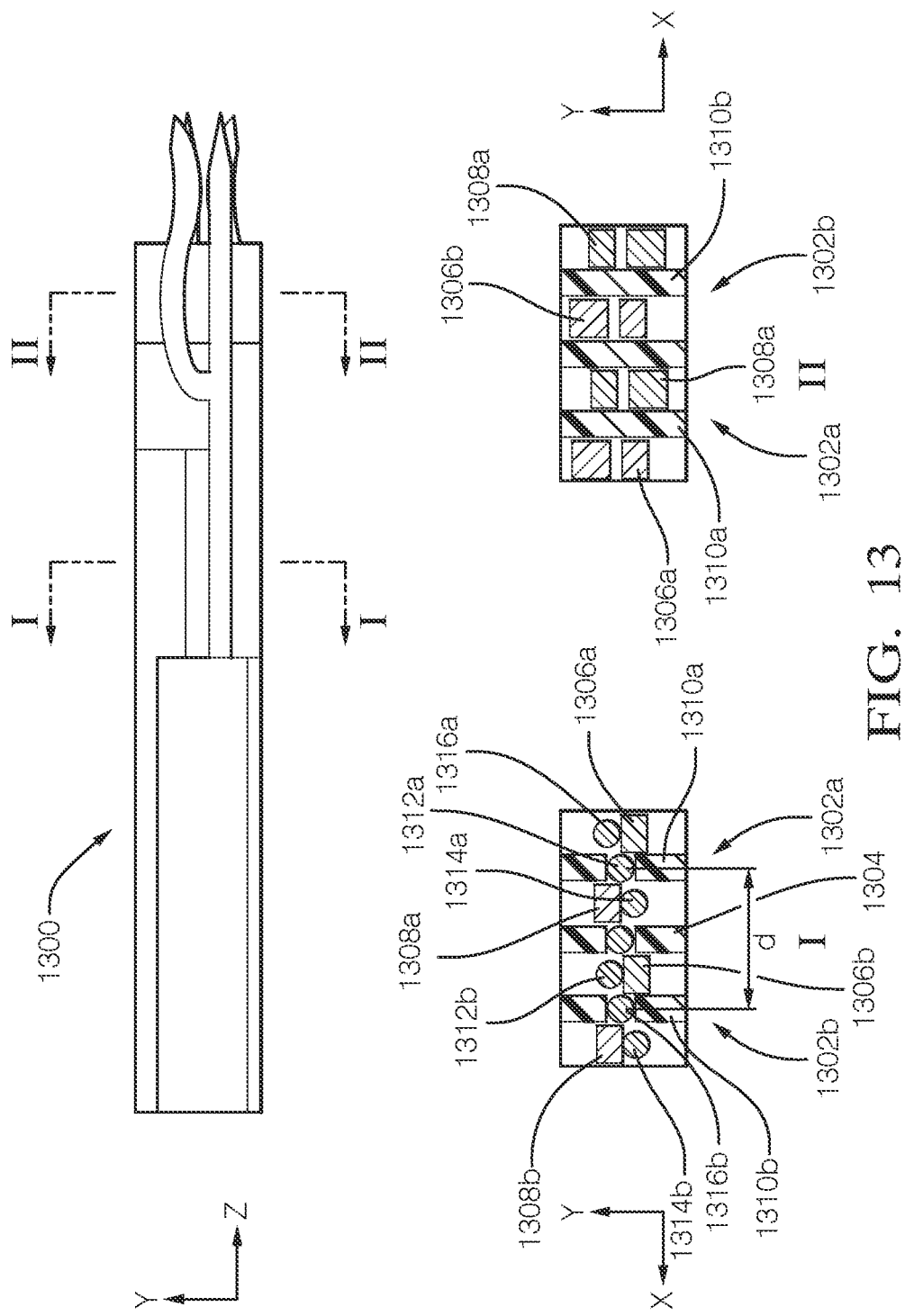
FIG. 13 shows an example cable connector.

For instance, FIG. 13 shows cross-section views of another example cable connector 1300. In this example, the cable connector 1300 includes two cells 1302a and 1302b, separated by a divider structure 1304. In an embodiment, each of the cells 1302a and 1302b is similar to the cable connector 1000 shown and described with respect to FIGS. 10A and 10B. For example, the first cell 1302a includes electrical prongs 1306a and 1308a secured to a mounting structure 1310a (e.g., similar to the electrical prongs 1016a and 1016b secured to the mounting structure 1012 shown and described with respect to FIGS. 10A and 10B). Further, the second cell 1302b includes electrical prongs 1306b and 1308b secured to a mounting structure 1310b (e.g., similar to the electrical prongs 1016a and 1016b secured to the mounting structure 1012 shown and described with respect to FIGS. 10A and 10B).

Each cell 1302a and 1302b provides two respective physical and electrical interconnections. For example, the electrical prongs 1306a and 1308a are coupled to conductive traces 1312a and 1314a, respectively, and provide a physical and electrical interface for those conductive traces to two other conductive traces. Further, electrical prongs 1306b and 1308b are coupled to conductive traces 1312b and 1314b, respectively, and provide a physical and electrical interface for those conductive traces to two other conductive traces. Accordingly, the cable connector 1300 provides a total of four physical and electrical interconnections. This can be useful, for example, in facilitating electrical connections between several cables concurrently (e.g., four of the cables 1100 show and described with respect to FIG. 11A, eight cables having a single conductive trace each, etc.).

Further, in an embodiment, the distance d between the central axes 1316a and 1316b of the cells 1302a and 1302b, respectively, are a particular standardized distance (e.g., approximately 2.54 mm, such as 2.54 mm±10%). This can be useful, for example, in enabling the cable connector to be used to physical environments that were designed according to a particular standardized design convention (e.g., an automotive electrical system design convention), while providing additional interconnections beyond those specified by that design convention (e.g., two or more interconnections for each cell, rather Although FIG. 13 shows a cable connector having two cells, in practice, cable connectors can include any number of similar of substantially identical cells separated from one another by dividers, each cell providing multiple interconnections (e.g., with a corresponding cell of another cable connector). In an embodiment, a cable connector has one, two, three, four, or more cells, arranged in any number of rows and columns, each providing two or more interconnections with a corresponding cell of another cable connector. Further, in an embodiment, a distance between a central axis of any cell and a central axis of another cell adjacent that cell is similar or substantially identical (e.g., approximately 2.54 mm, such as 2.54 mm±10%).

In an embodiment, some or all of the mounting portions a cable connector can be integrally formed with one another and/or with the housing of the cable connector. In an embodiment, some or all of the divider portions can be integrally formed with one or more mounting portions and/or the housing.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

We claim:
1. A cable connector comprising:
a communications cable having an insulative strand and first and second conductive strands, the insulative strand electrically isolating the first and second conductive strands from one another;
a first portion defining a cavity;
a second portion adjacent to the first portion, wherein the second portion comprises a mounting structure defining a first cross-sectional void region within the cable connector and a second-cross-sectional void region within the cable connector opposite the first cross-sectional void region, wherein the mounting structure defines a recess between the first cross-sectional void region and the second cross-sectional void region, the recess is configured to receive the insulative strand;
a first electrical prong at least partially disposed in the first cross-sectional void region and extending from the second portion, the first electrical prong in direct contact with the first conductive strand;
a second electrical prong at least partially disposed in the second cross-sectional void region and extending from the second portion, the second electrical prong in direct contact with the second conductive strand;
wherein the first electrical prong and the second electrical prong each include:
a respective base portion;
a respective first prong portion projecting from the base portion, wherein the first prong portion is substantially straight; and
a respective second prong portion projecting from the base portion, wherein the second prong portion defines a curved path, the second prong portion comprises a concave segment, the second prong portion comprises a convex segment adjacent to the concave segment; and
wherein the first and second prongs are physically separated from one another by the mounting structure.
2. The cable connector of claim 1, wherein the base portion is secured to the mounting structure.
3. The cable connector claim 1, wherein each base portion is configured to be electrically coupled to a respective conductor of a communications cable.
4. The cable connector of claim 1, wherein the cable connector has at least one cell that includes the first and second electrical prongs separated by the mounting structure within the at least one cell, the at least one cell has a cross-sectional periphery of the connector defines a square having a length up to 2.54 mm long and a height up to 2.54 mm high.

5. An assembly comprising:
the cable connector of claim 1; and
a second cable connector substantially similar to the cable connector,
wherein the first prong and the second prong of the cable connector accept between them a corresponding prong of the second cable connector.

6. The assembly of claim 5, wherein the corresponding prong of the second cable connector is substantially similar to the first prong.

7. The assembly of claim 5, wherein the second prong is configured to bend upon an insertion of the corresponding prong of the second connector between the first prong and the second prong.

8. A system comprising a plurality of cable connector sections that each include one of the cable connectors of claim 1.

9. The system of claim 8, wherein a periphery of the plurality of cable connector sections defines a substantially rectangular cross-section.

10. The system of claim 8, wherein
each mounting structure defines a respective recess between the first cross-sectional void region and the second cross-sectional void region; and
each recess is configured to receive a respective insulative strand of a communications cable.

11. The system of claim 8, wherein
a first cable connector section of the plurality of cable connector sections is disposed adjacent a second cable connector section of the plurality of cable connector sections; and
at least a portion of the first cable connector section is integrally formed with at least a portion of the second cable connector section.

12. The system of claim 11, wherein a distance between a central axis of the first cable connector section and a central axis of the second cable connector section is approximately 2.54 mm.

13. The system of claim 8, wherein
each first electrical prong and each second electrical prong includes:
a respective base portion,
a respective substantially straight first prong portion projecting from the base portion, and
a respective curved second prong portion projecting from the base portion, and each base portion is secured to a respective mounting structure.

14. The system of claim 13, wherein each base portion is configured to be electrically coupled to a respective conductor of a communications cable.

* * * * *